(12) United States Patent
Steen (10) Patent No.: US 12,229,917 B2
(45) Date of Patent: Feb. 18, 2025

(54) SYSTEM AND METHODS FOR FILTERING MEDICAL IMAGES

(71) Applicant: GE Precision Healthcare LLC, Wauwatosa, WI (US)

(72) Inventor: Erik Normann Steen, Horten (NO)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 371 days.

(21) Appl. No.: 17/664,389

(22) Filed: May 20, 2022

(65) Prior Publication Data
US 2023/0377104 A1    Nov. 23, 2023

(51) Int. Cl.
*G06T 5/20* (2006.01)
*G06T 5/50* (2006.01)
*G06T 5/70* (2024.01)
*G06T 5/73* (2024.01)

(52) U.S. Cl.
CPC .......... *G06T 5/20* (2013.01); *G06T 5/50* (2013.01); *G06T 5/70* (2024.01); *G06T 5/73* (2024.01); *G06T 2207/10016* (2013.01); *G06T 2207/20021* (2013.01); *G06T 2207/20081* (2013.01); *G06T 2207/20084* (2013.01); *G06T 2207/20104* (2013.01); *G06T 2207/20192* (2013.01); *G06T 2207/20221* (2013.01); *G06T 2207/30004* (2013.01)

(58) Field of Classification Search
CPC .... G06T 5/20; G06T 5/73; G06T 5/70; G06T 5/50; G06T 2207/10016; G06T 2207/20021; G06T 2207/20081; G06T 2207/20084; G06T 2207/20104; G06T 2207/30004

USPC ......................................................... 382/128
See application file for complete search history.

(56) References Cited

U.S. PATENT DOCUMENTS

| | | | | |
|---|---|---|---|---|
| 5,833,609 A | * | 11/1998 | Dannels | G01R 33/56341 324/309 |
| 7,729,467 B2 | * | 6/2010 | Kohlmyer | A61B 6/032 250/363.04 |
| 9,202,267 B1 | * | 12/2015 | Yang | G06T 5/73 |
| 10,643,319 B2 | * | 5/2020 | Chan | A61B 6/5235 |
| 11,337,607 B2 | * | 5/2022 | Jaiprakash | A61B 3/12 |
| 2018/0150598 A1 | * | 5/2018 | Kohls | G16H 50/20 |
| 2018/0206807 A1 | * | 7/2018 | Baruth | G06T 5/50 |
| 2019/0385288 A1 | * | 12/2019 | Stewart | G06T 5/70 |
| 2020/0029807 A1 | * | 1/2020 | Jaiprakash | A61B 3/0025 |
| 2020/0060660 A1 | * | 2/2020 | Waechter-Stehle | A61B 8/4438 |
| 2021/0073959 A1 | * | 3/2021 | Elmalem | G06N 3/084 |

(Continued)

*Primary Examiner* — William D Titcomb
(74) *Attorney, Agent, or Firm* — McCoy Russell LLP (57) ABSTRACT

Methods and systems are provided for training machine learning models to filter medical images with a reduced incidence of filtering artifact inclusion. In one example, training data may be generated by applying a filter to a medical image to produce a filtered medical image, wherein a subregion of the filtered medical image includes a filtering artifact, displaying the filtered medical image via a display device, receiving a selection of the subregion of the filtered medical image from a user input device, blending, in the subregion, pixel intensity values from the filtered medical image with pixel intensity values from the medical image, to produce a blended image, wherein a visibility of the filtering artifact is attenuated in the blended image, and displaying the blended image via the display device.

19 Claims, 7 Drawing Sheets

(56) References Cited

U.S. PATENT DOCUMENTS

| | | | |
|---|---|---|---|
| 2021/0192720 A1* | 6/2021 | Annangi | A61B 8/58 |
| 2021/0279847 A1* | 9/2021 | Nett | G06T 11/008 |
| 2022/0108421 A1* | 4/2022 | Shacklett | G06T 3/4046 |
| 2022/0114698 A1* | 4/2022 | Liu | G06T 3/04 |
| 2022/0130013 A1* | 4/2022 | Pottorff | G06T 3/4053 |
| 2022/0148256 A1* | 5/2022 | Liu | G06N 3/08 |
| 2023/0377104 A1* | 11/2023 | Steen | G06T 5/50 |

* cited by examiner

SYSTEM AND METHODS FOR FILTERING MEDICAL IMAGES

TECHNICAL FIELD

Embodiments of the subject matter disclosed herein relate to training machine learning models to filter medical images, and generating training data for training machine learning models to filter medical images.

BACKGROUND

Post processing filters may be applied to medical images to remove noise, increase contrast/resolution of anatomical structures, or otherwise enhance the medical image. However, post processing filters are known to produce filtering artifacts, e.g., by introducing false structures and/or by removing signal data from the original medical image. Machine learning models, such as convolutional neural networks (CNNs) have been shown to be able to replicate post processing filter behavior by learning from training data including filtered and un-filtered images. However, machine learning models trained in this manner produce filtering artifacts similar to conventional post processing filters. Therefore, it is generally desired to explore approaches for training machine learning models to filter medical images, while reducing a probability of filtering artifact inclusion.

SUMMARY

The inventors herein have developed systems and methods which may enable training of machine learning models to filter medical images with a reduced incidence of filtering artifact inclusion. In one example, a machine learning model may be trained to approximate one or more conventional filters while reducing a probability of filtering artifact inclusion by a method comprising, receiving a medical image, applying a filter to the medical image to produce a filtered medical image, wherein a subregion of the filtered medical image includes a filtering artifact, displaying the filtered medical image via a display device, receiving a selection of the subregion of the filtered medical image from a user input device, blending, in the subregion, pixel intensity values from the filtered medical image with pixel intensity values from the medical image, to produce a blended image, wherein a visibility of the filtering artifact is attenuated in the blended image, displaying the blended image via the display device, storing the medical image and the blended image as a training data pair, and training a machine learning model using the training data pair. In this way, filtering artifacts may be efficiently removed from conventionally filtered medical images, without loss of image data and without requiring computationally expensive synthesis of image regions. Further, by using the blended image, as opposed to the filtered medical image, as a target image in a machine learning model training procedure, the machine learning model may learn to approximate the behavior of the conventional filter, without producing filtering artifacts associated with the conventional filter.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

The drawings illustrate specific aspects of the described system and methods for training machine learning models to filter medical images. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

The following description relates to systems and methods for training machine learning models to approximate one or more post processing filters (herein referred to simply as filters), while reducing a probability of filtering artifact inclusion, as compared to said one or more post processing filters. A limitation of conventional post processing filters is the tendency for said filters to introduce filtering artifacts. Filtering artifacts may manifest as removal of image data (e.g., suppression or removal of anatomical regions or structures captured by a medical image), or may manifest as spurious image data, e.g., additional features/structures not present in the un-filtered image. Machine learning models trained using conventionally filtered medical images may learn to recreate filtering artifacts similar to those present in the conventionally filtered images. Current approaches for removing filtering artifacts from filtered images are time consuming, computationally inefficient, and may produce images with reduced richness of data. In one example, a conventional approach may include excising a subregion of a filtered image including a filtering artifact, and either leaving the excised subregion blank, or replacing the excised subregion with synthesized data. Synthesis of data is computationally expensive, and further, synthesized data may lack the depth of information present in "natural" images.

The inventors herein provide systems and methods which enable computationally efficient attenuation of filtering artifacts in filtered medical images. In one example, the inventors realized that by leveraging both filtered and un-filtered images, a blended image may be efficiently generated which selectively combines pixel/voxel intensity values from both the filtered and un-filtered images, to produce a blended image having characteristics similar to the filtered image, but with attenuated visibility of filtering artifacts, while preserving data richness. Further, by utilizing the blended images as target images in a training procedure, machine learning models may learn a mapping from an un-filtered image space to an image space having characteristics similar to those of the blended images, e.g., approximation of the conventional post processing filter(s) but with attenuated filtering artifacts.

Figure 1:
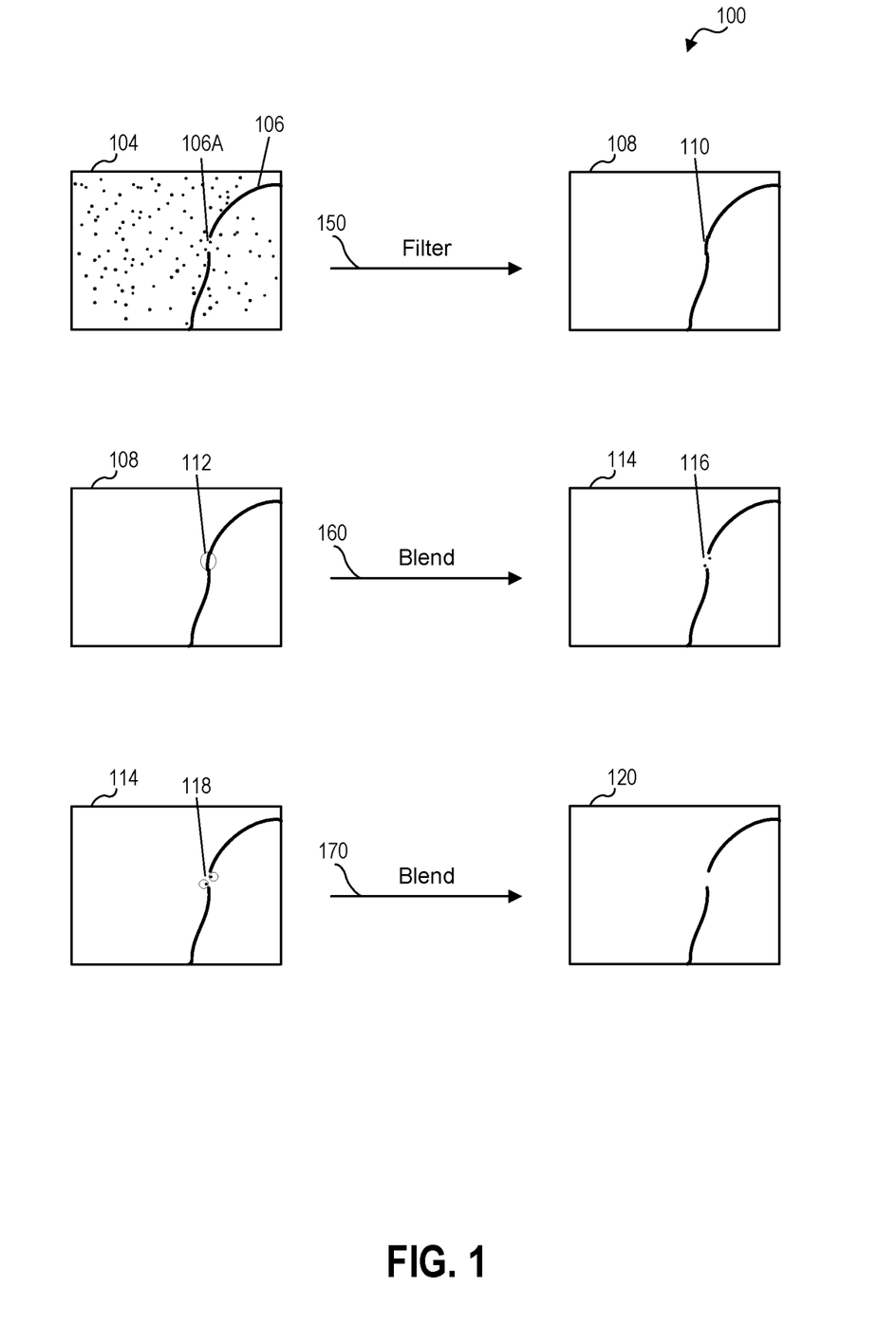
FIG. 1 illustrates an exemplary process of generating a training data pair from a medical image.

In one embodiment, filtering artifacts may be attenuated in filtered images according to a process 100 illustrated in FIG. 1, wherein a medical image 104 is filtered using a conventional post processing filter, and the filtered medical image 108 is blended in at least a first subregion 112 with pixel/voxel intensity values from the un-filtered medical image 104, to produce a first blended image 114. Method 200, shown in FIG. 2, may be executed by an image processing system 500, shown in FIG. 5, to perform operations similar to those illustrated in FIG. 1, to generate a training data pair. In particular, method 200 includes generating a training data pair by filtering and blending a medical image, similar to the process illustrated by FIG. 1, to produce a blended image wherein a visibility of a filtering artifact is reduced. Method 200 further includes storing the un-filtered medical image and the blended image as a training data pair, which may be used to train a machine learning model according to one or more operations of method 600, shown in FIG. 6. Similarly, method 300, shown in FIG. 3, provides a method whereby two or more filters are applied to a medical image to produce two or more filtered images, and a blended image is produced by selectively combining pixel/voxel intensity values from the two or more filtered images in one or more subregions. A machine learning model trained according to method 600, may be implemented according to method 700, shown in FIG. 7, to produce filtered medical images having visual characteristics similar to those produced by one or more conventional filters, but with a reduced probability of filtering artifact inclusion.

Figure 4:
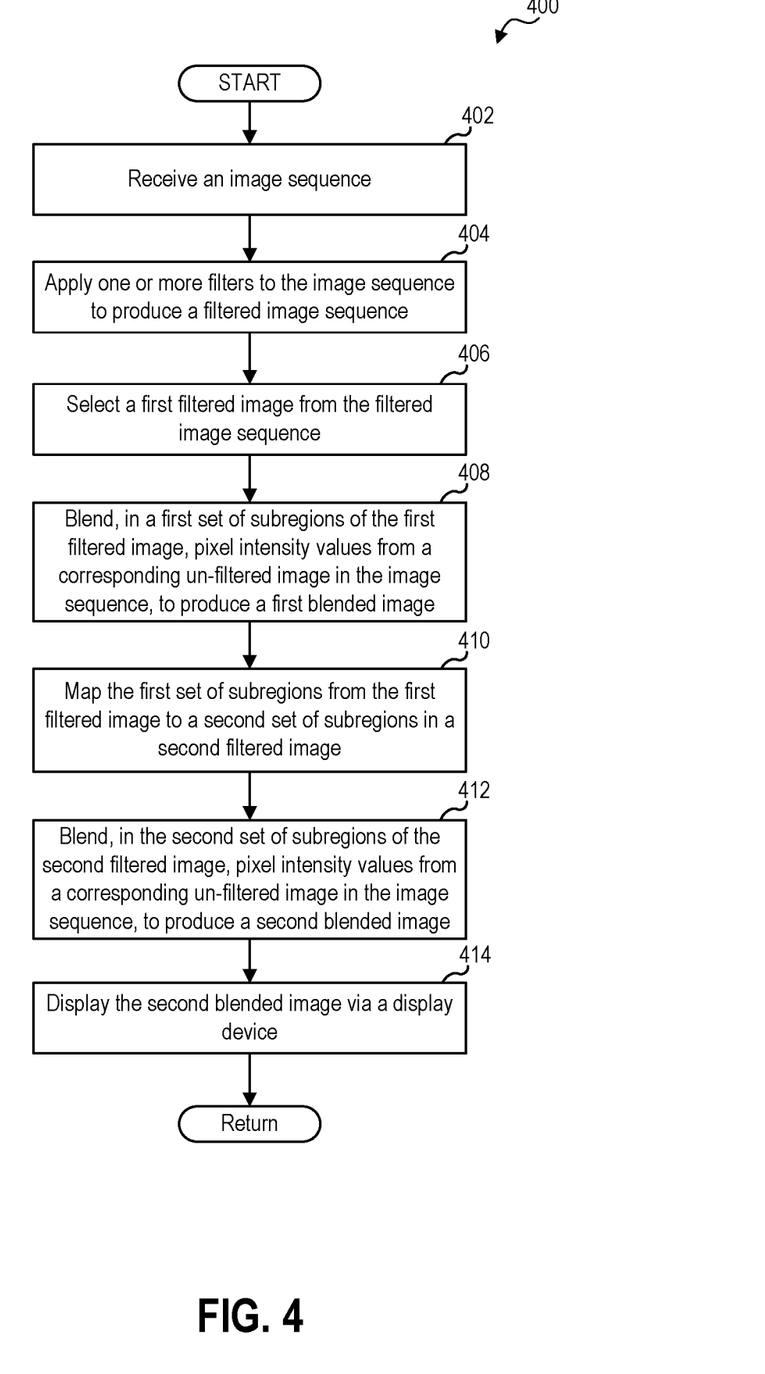
FIG. 4 is a flow chart of a method for automatically applying a blending from a first image in an image sequence to a second image in an image sequence, according to an exemplary embodiment.

In some embodiments, an image sequence, such as a plurality of two-dimensional (2D) images comprising a three-dimensional (3D) volume, or a plurality of 2D or 3D images comprising a time-series/video, may be efficiently transformed into a plurality of training data pairs according to one or more of the operations of method 400, shown in FIG. 4. In particular, method 400 teaches automatically applying a blending from a first image in the image sequence, to a second image in the image sequence, to thereby accelerate the filter artifact attenuation process.

As used herein, the term filter or filtering refers to application of a post processing filter, or filters, to a medical image. Filters may be applied to medical images to remove intensity discontinuities (e.g., remove noise), to increase contrast/sharpness of boundaries, or to otherwise enhance the appearance of a medical image. Images following application of one or more post processing filters may be referred to herein as filtered images, whereas images prior to application of a post processing filter may be referred to as un-filtered images. As a non-limiting example, post processing filters may include smoothing filters, noise reduction filters, sharpening filters, and other filters known in the art of image post processing.

As used herein, the term blend, blending, and other similar terms, refers to selective combination, within one or more subregions, of pixel or voxel intensity values from two or more images, wherein the pixel/voxel intensity values are linearly combined on a per pixel/voxel basis. As an example, a pixel at position 1, 1 of a first 2D image (that is, row 1 column 1 of the first 2D image) may have a first intensity value of A, and a corresponding pixel from a position 1, 1 of a second 2D image may have a second intensity value of B. The intensity values of the first and second image may be "blended" by taking a weighted average of the two intensity values A and B, to produce a new blended intensity value C, representing the weighting combination of the pixel intensity value from the two images. In images with multiple color channels, this blending may occur on a per color channel basis. An image, following execution of one or more blending procedures thereon, may be referred to herein as a blended image.

Turning to FIG. 1, an exemplary process 100 of generating a training data pair from a medical image 104 is shown. Medical image 104 may be a 2D or 3D image, and may be one or more of an ultrasound image, an X-ray image, a magnetic resonance (MR) image, a positron emission tomography (PET) image, a computed tomography (CT) image, or an image from other imaging modalities known in the art of medical imaging. Medical image 104 includes an anatomical structure 106. Anatomical structure 106 may comprise one or more tissues, organs, implants, or portions thereof, captured by medical image 104. The anatomical structure 106 captured in medical image 104 includes an opening 106A, which, in one example, may represent an open heart valve. As can be seen, medical image 104 includes background noise, as depicted by the speckling of black dots.

The medical image 104 may be filtered, as indicated by arrow 150. In one example, filtering may comprise applying a smoothing filter to reduce background noise, and/or applying a sharpening filter, to increase boundary sharpness, to produce filtered medical image 108. Filtered medical image 108 includes a filtering artifact 110, which appears as a blockage or closure of opening 106A. Filtered medical image 108 contains markedly less background noise than medical image 104, however inclusion of filtering artifact 110 may limit the usefulness of filtered medical image 108, e.g., using filtered medical image 108 as a target image in a training process of a machine learning model may induce the machine learning model to learn to hallucinate artifacts similar to filtering artifact 110.

As will be described in more detail below, visibility of filtering artifact 110 may be at least partially attenuated by blending pixel intensity values from medical image 104 with pixel intensity values from filtered medical image 108 in subregion 112 to produce a first blended image 114. In a first blending process, indicated by arrow 160, pixel intensity values within subregion 112 of filtered medical image 108 are reverted to corresponding pixel intensity values from medical image 104 (that is, the weighting of pixel intensity values in subregion 112 is 100% for pixel intensity values from medical image 104, and 0% for pixel intensity values from filtered medical image 108). Thus, first blended image 114 comprises a selective combination of both the filtered medical image 108 and the medical image 104, in particular, regions outside of subregion 112 maintain pixel intensity values from filtered medical image 108, while pixel intensity values within subregion 112 are from medical image 104. An advantage of the current approach is that, as opposed to excising filtering artifact 110, which may inadvertently remove a portion of anatomical structure 106, by reverting pixel intensity values to those from the un-filtered medical image 104, anatomical structure data is not lost. Further, even if subregion 112 were increased in size to encompass portions of anatomical structure 106, anatomical structure data would not be lost, as the anatomical structure 106 was present in medical image 104. As pixel intensity values are reverted to those of the medical image 104 in subregion 112, background noise 116 which was present in medical image 104 may appear in first blended image 114.

Background noise 116 may be removed via a second blending process, indicated by arrow 170, to produce a second blended image 120. In the second blending process, subregions 118 including background noise 116 may be selected and the pixel intensity values therein may be reverted to those of filtered medical image 108. In other words, within subregions 118, the second blending process comprises weighting each pixel with 100% of the intensity value from filtered medical image 108, and 0% of the intensity value from medical image 104. It will be appreciated that the weighting factors may be any positive value, or percent, and the above weighting factors of 100% and 0% were chosen for illustrative purposes.

Thus FIG. 1 illustrates one exemplary process by which a medical image may be filtered, and one or more filtering artifacts occupying one or more subregions of the filtered image may be efficiently attenuated by locally blending pixel intensity values from the filtered image with pixel intensity values from the un-filtered medical image. The un-filtered medical image and the blended image may then be used as a training data pair, to enable a machine learning model to infer images similar to the blended image directly from un-filtered medical images.

Figure 2:
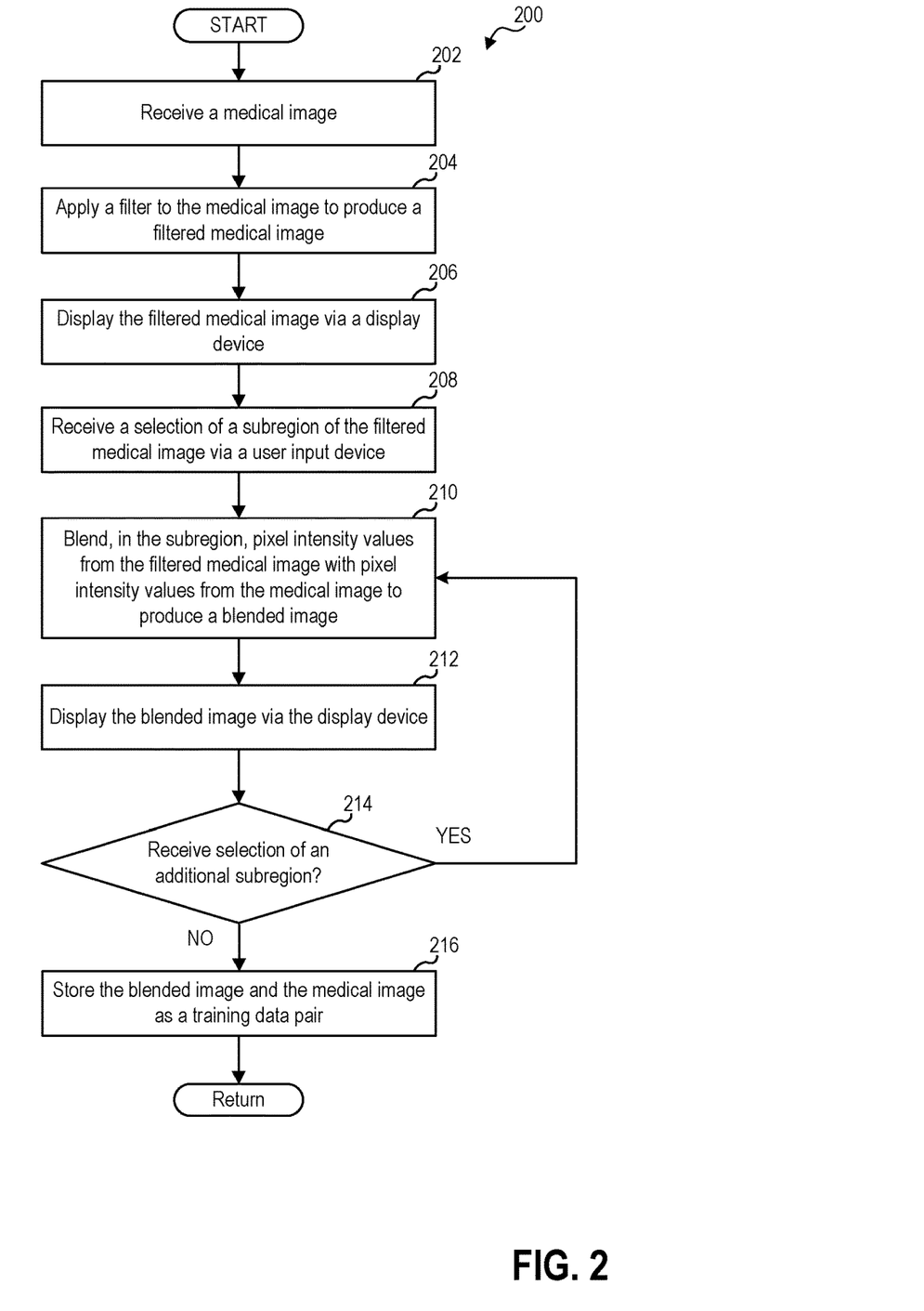
FIG. 2 is a flow chart of a method for blending a filtered medical image with an un-filtered medical image to produce a blended image, according to an exemplary embodiment.
Figure 3:
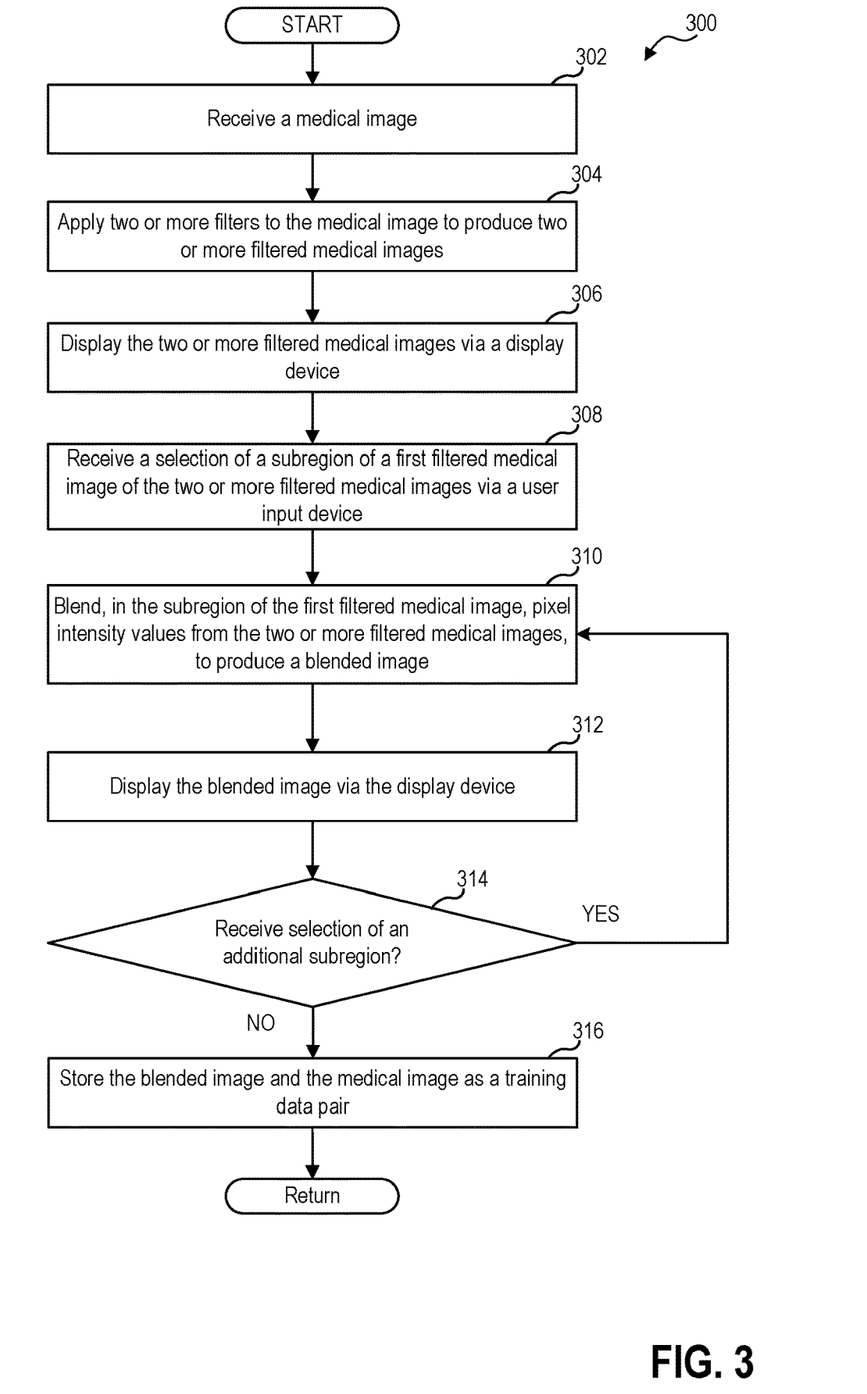
FIG. 3 is a flow chart of a method for blending a filtered medical image one or more additional filtered medical images to produce a blended image, according to an exemplary embodiment.

Referring to FIG. 2, a flow chart of a method 200 for generating a training data pair from a medical image is shown. In some embodiments, method 200 may be implemented by an image processing system, such as image processing system 500, shown in FIG. 5.

At operation 202, the image processing system receives a medical image. The medical image may be a 2D or 3D image, and may be one or more of an ultrasound image, an X-ray image, an MR image, a PET image, a CT image, or an image from other imaging modalities known in the art of medical imaging. The medical image may in some embodiments include an anatomical region. The medical image may be received via a wired or wireless connection to one or more imaging devices. In some embodiments, the image may be received from a remotely located image processing system, communicatively coupled to the image processing system executing method 200.

At operation 204, the image processing system applies a filter to the medical image to produce a filtered medical image. In some embodiments, at operation 204, the image processing system may apply a post processing filter, or filters, to the medical to remove intensity discontinuities (e.g., remove noise), to increase contrast/sharpness of boundaries, or to otherwise enhance the appearance of the medical image. In particular, one or more filters may be applied at operation 204 to increase visibility and clarity of one or more anatomical regions captured by the medical image. In some embodiments, operation 204 includes the image processing system applying one or more of a smoothing filter, a sharpening filter, or other filters known in the art of image post processing, to produce a filtered medical image. In some embodiments, the filtered medical image includes one or more filtering artifacts in one or more subregions. Filtering artifacts may include false/hallucinated structures, artificial thickening of one or more anatomical structures (e.g., heart valves), or spurious connections formed between anatomically separate structures (e.g., appearance of structures connecting an open heart valve, thus giving the appearance that the heart valve is closed).

At operation 206, the image processing system displays the filtered medical image via a display device. In some embodiments, the image processing system may display the filtered medical image along with the un-filtered medical image, to facilitate comparison between the filtered and un-filtered medical images.

At operation 208, the image processing system receives a selection of a subregion of the filtered medical image via a user input device. In some embodiments, a subregion comprises a set of pixel/voxel positions, e.g., for a 2D image pixel positions may be uniquely indicated by a row number and a column number, e.g., (1, 2) may uniquely identified a pixel in row 1, column 2, of a 2D image. In some embodiments, the set of pixel/voxel positions may be contiguous, whereas in some embodiments the set of pixel/voxel positions may not be contiguous. In one example, a brush tool or lasso tool may be used to select the subregion of the filtered image including a filtering artifact. The image processing system may receive the selection via a user input device connected thereto via a wired or wireless connection. In some embodiments, at operation 208 the image processing system receives a user input, including a selection of the subregion, and selection of one or more weighting factors, wherein the weighting factors may be used to blend pixel intensity values from the medical image and the filtered medical image, as described at operation 210, below.

At operation 210, the image processing system blends, in the subregion, pixel/voxel intensity values from the filtered medical image with pixel/voxel intensity values from the medical image to produce a blended image. In some embodiments, blending pixel/voxel intensity values from the filtered medical image with pixel/voxel intensity values from the medical image comprises setting a blended intensity value, $I_i$, of a pixel (or voxel) i in the subregion of the filtered medical image according to a first blending equation, given below:

$$I_i = w_A I_{i,A} + w_B I_{i,B}$$

wherein, $I_i$ is the blended intensity value of pixel/voxel i in the subregion, $w_A$ is a weighting factor for the medical image, $I_{i,A}$ is an intensity value of the pixel/voxel i in the subregion of the medical image, $w_B$ is a weighting factor for the filtered medical image, and $I_{i,B}$ is an intensity value of the pixel/voxel i in the subregion of the filtered medical image.

In one particular example, a blended intensity value $I_i$ of a pixel in row 3, column 5, of a filtered medical image, may be set to 474 based a first weighting factor ($w_A$) of 0.75, a first intensity value ($I_{i,A}$) of a pixel in row 3, column 5 of the medical image being 388, a second weighting factor ($w_B$) of 0.25, and a second intensity value ($I_{i,B}$) of a pixel in row 3, column 5 of the filtered medical image being 732.

It will be appreciated that the above equation may be applied to each pixel/voxel within the selected subregion. As can be seen, as $w_A$ increases relative to $w_B$, the appearance within the subregion of the filtered medical image will more strongly resemble the corresponding subregion of the medical image. In other words, at operation 210, the image processing system may produce a blended image by locally mixing or blending pixel intensity values from the un-filtered image with the filtered image, in the selected subregion.

At operation 212, the image processing system displays the blended image via the display device. The image processing system may display the blended image, along with the filtered medical image, and the un-filtered medical image, to facilitate comparison.

At operation 214, the image processing system determines if an additional subregion has been selected. If at operation 214 the image processing system determines that an additional subregion has been selected, method 200 may return to operation 210, wherein pixel intensity values from the medical image and the filtered medical image may be blended based on the user input, to produce a second blended image, and the second blended image may be displayed via the display device at operation 212. However, if at operation 214, the image processing system determines that no additional subregion selections are received, method 200 proceeds to operation 216.

At operation 216, the image processing system stores the blended image and the medical image as a training data pair. In some embodiments, the image processing system may store the un-filtered medical image received at operation 202, along with the blended image produced following one or more blending operations at operation 210, wherein the un-filtered medical image is set as the input data of the training data pair, and the blended image is set as the ground truth data, also referred to as a target image (or target blended image) of the training data pair. The training data pair may be stored in non-transitory memory, such as in image data 512 of non-transitory memory 506. In some embodiments, each training data pair may be subdivided into a plurality of training data "patches", by splitting the medical image, and the target blended image, into a plurality of spatially corresponding subregions or "patches". In some embodiments, each of the plurality of patches may be of a same size. Following operation 216, method 200 may end.

In this way, method 200 provides efficient attenuation of one or more filtering artifacts present in a filtered medical image, by selectively weighting in pixel intensity values from the un-filtered image. Method 200 enables generation of a training data pair comprising a target image having enhanced visual characteristics as compared to conventionally filtered images, e.g., a reduced visibility of filtering artifacts, without loss of image data and without use of computationally expensive data synthesis techniques.

Referring to FIG. 3, a flow chart of a method 300 for generating a training data pair from a medical image is shown. In some embodiments, method 300 may be implemented by an image processing system, such as image processing system 500, shown in FIG. 5.

At operation 302, the image processing system receives a medical image. The medical image may be a 2D or 3D image, and may be one or more of an ultrasound image, an X-ray image, an MR image, a PET image, a CT image, or an image from other imaging modalities known in the art of medical imaging. The medical image may in some embodiments include an anatomical region. The medical image may be received via a wired or wireless connection to one or more imaging devices. In some embodiments, the image may be received from a remotely located image processing system, communicatively coupled to the image processing system executing method 300.

At operation 304, the image processing system applies two or more filters to the medical image to produce two or more filtered medical images. In some embodiments, at operation 304, the image processing system may apply two or more post processing filters to the medical to produce two distinct filtered medical images. In some examples, a first filter may remove intensity discontinuities (e.g., remove noise), while a second filter may increase contrast/sharpness of boundaries of one or more anatomical regions captured by the medical image. The two or more filtered medical images may possess distinct characteristics, e.g., a first filtered medical image may include a first filtering artifact in a first subregion, whereas a second filtered medical image may not possess a filtering artifact, or may possess a filtering artifact in a second subregion distinct from the first subregion.

At operation 306, the image processing system displays the two or more filtered medical images via a display device. The image processing system may display the medical image, along with the two or more filtered images produced at operation 304 to facilitate comparison between the three or more images.

At operation 308, the image processing system receives a selection of a subregion of a first filtered medical image of the two or more filtered medical images via a user input device. In some embodiments, the first filtered medical image may include a filtering artifact in the selected subregion. As previously stated, in some embodiments, a subregion comprises a set of pixel/voxel positions, e.g., for a 3D image voxel positions may be uniquely indicated by a row number, a column number, and a layer number e.g., (1, 2, 4) may uniquely identified a voxel in row 1, column 2, and layer 4 of a 3D image. In some embodiments, the set of pixel/voxel positions may be contiguous, whereas in some embodiments the set of pixel/voxel positions may not be contiguous. In one example, a brush tool or lasso tool may be used to select the subregion of the filtered image including a filtering artifact. The image processing system may receive the selection via a user input device connected thereto via a wired or wireless connection. In some embodiments, at operation 308 the image processing system receives a user input, including a selection of the subregion, and selection of a plurality of weighting factors, wherein the plurality of weighting factors may be used to blend pixel intensity values from the two or more filtered medical images, as described at operation 310, below.

At operation 310, the image processing system blends, in the subregion of the first filtered medical image, pixel intensity values from the two or more filtered medical images, to produce a blended image. In some embodiments, blending pixel/voxel intensity values from the first filtered medical image with pixel/voxel intensity values from one or more additional filtered medical images comprises setting a blended intensity value, $I_i$, of a pixel (or voxel) i in the subregion of the first filtered medical image according to a second blending equation, given below:

$$I_i = \sum_{j}^{N} w_j I_{i,j}$$

Wherein, $I_i$ is a blended intensity value of pixel i in the subregion of the first filtered medical image, N is a number of images to be blended e.g., the first filtered medical image along with the additional filtered medical images and in some embodiments the un-filtered medical image, j is an index over the number of images to be blended, $w_j$ is a weighting factor for pixel/voxel intensity values from image j, and $I_{i,j}$ is an intensity value of pixel i from image j.

It will be appreciated that the above equation may be applied to each pixel/voxel within the selected subregion. As can be seen, as $w_j$ increases, the appearance within the subregion of the first filtered medical image will more strongly resemble the corresponding subregion of the medical image j.

At operation 312, the image processing system displays the blended image via the display device. The image processing system may display the blended image, along with the two or more filtered images, and the un-filtered medical image.

At operation 314, the image processing system determines if an additional subregion has been selected. If at operation 314 the image processing system determines that an additional subregion has been selected, method 300 may return to operation 310, wherein pixel intensity values from the medical image and the filtered medical image may be blended based on the user input, to produce a second blended image, and the second blended image may be displayed via the display device at operation 312. However, if at operation 314, the image processing system determines that no additional subregion selections are received, method 300 proceeds to operation 316.

At operation 316, the image processing system stores the blended image and the medical image as a training data pair. In some embodiments, the image processing system may store the un-filtered medical image received at operation 302, along with the blended image produced following one or more blending operations at operation 310, wherein the un-filtered medical image is set as the input data of the training data pair, and the blended image is set as the ground truth data, also referred to as a target image (or target blended image) of the training data pair. The training data pair may be stored in non-transitory memory, such as in image data 512 of non-transitory memory 506. In some embodiments, each training data pair may be subdivided into a plurality of training data "patches", by splitting the medical image, and the target blended image, into a plurality of spatially corresponding subregions or "patches". In some embodiments, each of the plurality of patches may be of a same size. Following operation 316, method 300 may end.

In this way, method 300 enables removal/attenuation of one or more filtering artifacts from a first filtered medical image by locally blending, in one or more selected subregions of the first filtered image, pixel intensity values from a plurality of filtered medical images. Thus, method 300 may produce training data pairs comprising target images which possess one or more characteristics of one or more filters, while also reducing a reduced visibility of one or more filtering artifacts.

Referring to FIG. 4, a flow chart of a method 400 for efficiently generating a plurality of training data pairs from an image sequence is shown. In some embodiments, method 400 may be implemented by an image processing system, such as image processing system 500, shown in FIG. 5.

Method 400 begins at operation 402, wherein the image processing system receives an image sequence. In some embodiments, the image sequence comprises a plurality of 2D image slices of a 3D image, or a plurality of 2D or 3D images (frames) comprising a time series or video. Each image in the image sequence may have a definite position or order within the image sequence, thus establishing sequential relationships between the plurality of images in the image sequence, e.g., images in an image sequence have one or more "neighboring" images. The image sequence may be received via a wired or wireless connection to one or more imaging devices. In some embodiments, the image may be received from a remotely located image processing system, communicatively coupled to the image processing system executing method 400.

At operation 404, the image processing system applies one or more filters to the image sequence to produce one or more filtered image sequences. In some embodiments, at operation 404, the image processing system may apply a post processing filter, or a plurality of filters, to each medical image in the image sequence to remove intensity discontinuities (e.g., remove noise), to increase contrast/sharpness of boundaries, or to otherwise enhance the appearance of the image sequence. In particular, one or more filters may be applied at operation 404 to increase visibility and clarity of one or more anatomical regions captured by the image sequence.

At operation 406, the image processing system selects a first filtered image from the filtered image sequence. In some embodiments, the image processing system may select an image from the image sequence based on input received via a user input device. In some embodiments, the first filtered medical image may be selected automatically by the image processing system. The first filtered medical image may include one or more filtering artifacts present in a first set of subregions.

At operation 408, the image processing system blends, in the first set of subregions of the first filtered image, pixel intensity values from a first un-filtered image in the image sequence, to produce a first blended image. Operation 408 may proceed similarly to the blending operations described above in methods 200 and/or 300. In particular, at operation 408 one or more subregions (that is, the first set of subregions) containing filtering artifacts in the first filtered image may be selected based on input received from a user input device, and pixel/voxel intensity values in the first set of subregions may be blended with pixel/voxel intensity values from the first un-filtered image. It will be appreciated that the first filtered image and the first un-filtered image occupy a same position within their respective image sequences, in other words, the first filtered image is the first un-filtered image (e.g., represent a same image slice or frame) following application of the one or more filters at operation 404. The first set of subregions along with the plurality of weighting factors applied to produce the first blended image may, for simplicity, be referred to herein as a "blending", e.g., to apply a same "blending" to a second image as was applied to a first image refers to applying a same plurality of weighting factors with respect to a same collection of images, to a same set of subregions/pixel positions.

At operation 410, the image processing system maps the first set of subregions from the first filtered image to a second set of subregions in a second filtered image. In some embodiments, the first set of subregions may be directly mapped from pixel/voxel positions of the first filtered image to pixel/voxel positions of the second filtered image, e.g., a first subregion comprising a circle of pixels of radius 5 (pixels) centered at pixel 34, 45 of the first filtered image may be directly mapped to a circle of radius 5 (pixels) centered at pixel 34, 45 of the second filtered image. However, in some embodiments, an adaptive mapping may be used, wherein one or more structures or landmarks present in the first filtered image may be mapped to one or more structures or landmarks present in the second filtered image, and a difference in position of the one or more landmarks or structures (with respect to the underlying pixel/voxel grid) may be used to map the positions of the first set of subregions to a linearly transformed second set of subregions. In some embodiments, the second filtered image may be a neighboring image slice or frame to the first filtered image, thereby taking advantage of the fact that proximate images in an image sequence are more likely to share properties, and thus may benefit from application of a similar blending (as they may be prone to similar filtering artifacts in similar positions).

At operation 412, the image processing system automatically blends, in the second set of subregions of the second filtered image, pixel intensity values from a second un-filtered image in the image sequence, to produce a second blended image. The second un-filtered image corresponds to a same slice number or frame number as the second filtered image, but taken from the image sequence as opposed to the filtered image sequence. The image processing system may perform a blending substantially similar to that described with respect to operation 408 above, but with the first filtered image replaced by the second filtered image, the first un-filtered image replaced by the second un-filtered image, and the first set of subregions replaced by the second set of subregions. A same plurality of weighting factors used at operation 408 may be used at operation 412.

At operation 414, the image processing system displays the second blended image via a display device. Following operation 414, method 400 may end. In this way, method 400 accelerates a process of removing filtering artifacts from an image sequence, by automatically applying a blending from a first filtered image to a second filtered image, wherein the first filtered image and the second filtered image may be neighboring slices or frames in the image sequence. Thus, method 400 leverages the fact that proximal images in an image sequence may have similar properties, and thus may produce similar filtering artifacts upon application of one or more filters.

Figure 5:
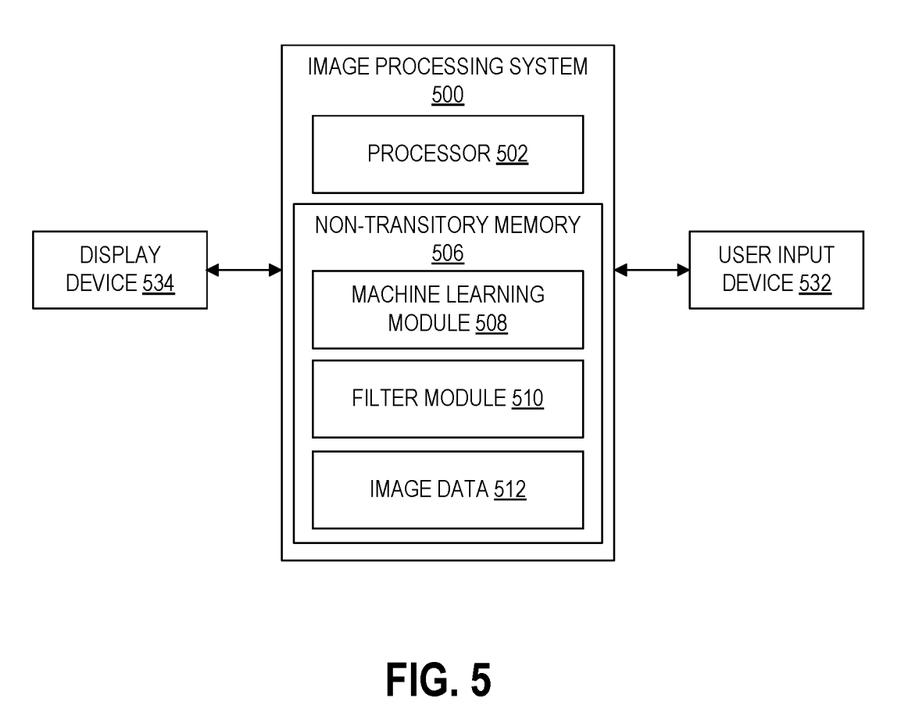
FIG. 5 is a block diagram of an exemplary embodiment of an image processing system.

Referring to FIG. 5, an image processing system 500 is shown, in accordance with an exemplary embodiment. In some embodiments, at least a portion of image processing system 500 is disposed at a remote device (e.g., edge device, server, etc.) communicably coupled to image processing system 500 via wired and/or wireless connections. In some embodiments, at least a portion of image processing system 500 is disposed at a separate device (e.g., a workstation) which can receive images from the image processing system 500 or from a storage device which stores the images generated by one or more additional image processing systems. Image processing system 500 includes processor 502, display device 534, and user input device 532.

Processor 502 is configured to execute machine readable instructions stored in non-transitory memory 506. Processor 502 may be single core or multi-core, and the programs executed thereon may be configured for parallel or distributed processing. In some embodiments, the processor 502 may optionally include individual components that are distributed throughout two or more devices, which may be remotely located and/or configured for coordinated processing. In some embodiments, one or more aspects of the processor 502 may be virtualized and executed by remotely-accessible networked computing devices configured in a cloud computing configuration.

Non-transitory memory 506 may store machine learning module 508, filter module 510, and image data 512. Machine learning module 508 may include one or more deep neural networks, comprising a plurality of weights and biases, activation functions, and instructions for implementing the one or more deep neural networks to map medical images to a target image space. For example, machine learning module 508 may store instructions for implementing a neural network, such as U-net. Machine learning module 508 may include trained and/or untrained neural networks and may further include various metadata for the one or more trained or untrained deep neural networks stored therein.

The machine learning module 508 may further include instructions for training one or more of the deep neural networks stored therein. Machine learning module 508 may include instructions that when executed by processor 502, cause processor 502 to conduct one or more of the steps of method 600, discussed in more detail below with reference to FIG. 6. In one example, machine learning module 508 includes instructions for receiving training data pairs from image data 512, wherein said training data pairs comprise un-filtered medical images and corresponding blended images (that is, target images) for use in training one or more deep neural networks. In another example, machine learning module 508 may include instructions for generating training data by executing one or more of the operations of methods 200, 300, and/or 400, discussed in more detail above. In some embodiments, the machine learning module 508 is not disposed at the image processing system 500, but is located remotely and communicatively coupled to image processing system 500.

Non-transitory memory 506 further includes filter module 510, which comprises instructions for applying one or more post processing filters to medical images. In some embodiments, filter module 510 may include instructions for performing one or more of smoothing, and/or sharpening medical images using one or more conventional filtering techniques known in the art of image processing. As an example, filter module 510 may apply a post processing filter, or filters, to a medical image to remove intensity discontinuities, to increase contrast/sharpness of boundaries, or to otherwise enhance the appearance of the medical image.

Non-transitory memory 506 may further store image data 512. Image data 512 may include medical images, such as 2D or 3D images of anatomical regions of one or more imaging subjects. In some embodiments, the images stored in image data 512 may have been acquired via a wired or wireless connection to one or more imaging devices. In some embodiments, the images stored in image data 512 may have been acquired from remotely located image processing systems, communicatively coupled to image processing system 500. Image data 512 may include un-filtered, filtered, and blended medical images. Images stored in image data 512 may include metadata pertaining to the images stored therein.

In some embodiments, the non-transitory memory 506 may include components disposed at two or more devices, which may be remotely located and/or configured for coordinated processing. In some embodiments, one or more aspects of the non-transitory memory 506 may include remotely-accessible networked storage devices configured in a cloud computing configuration.

Image processing system 500 may further include user input device 532. User input device 532 may comprise one or more of a touchscreen, a keyboard, a mouse, a trackpad, a motion sensing camera, or other device configured to enable a user to interact with and manipulate data within processor 502. In one example, user input device 532 may enable a make a selection of a subregion of one or more images, and/or select weighting factors for use in blending pixel intensity values from two or more images.

Display device 534 may include one or more display devices utilizing virtually any type of technology. Display device 534 may be combined with processor 502, non-transitory memory 506, and/or user input device 532 in a shared enclosure, or may be peripheral display device and may comprise a monitor, touchscreen, projector, or other display device known in the art, which may enable a user to view 2D medical images, 3D medical images, and/or interact with various data stored in non-transitory memory 506.

It should be understood that image processing system 500 shown in FIG. 5 is for illustration, not for limitation. Another appropriate image processing system may include more, fewer, or different components.

Figure 6:
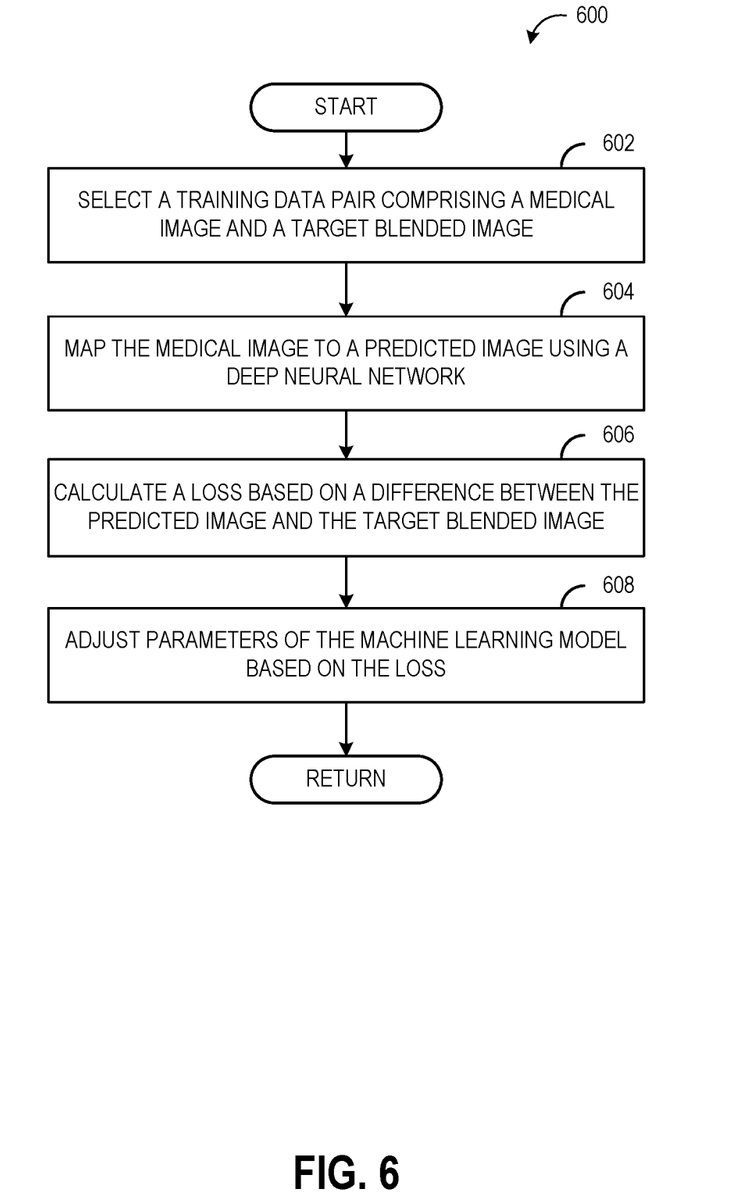
FIG. 6 is a flow chart illustrating a method for training a machine learning model using one or more training data pairs generated according to embodiments of the current disclosure.

Referring to FIG. 6, a flow chart of an exemplary method 600 for training a deep neural network to learn a mapping from an un-filtered image space to a blended image space, is shown. Method 600 may be implemented by the image processing system 500, shown in FIG. 5, based on instructions stored in non-transitory memory 506.

Method 600 begins at operation 602, where a training data pair, from a plurality of training data pairs, is selected to be fed to a deep neural network. The training data pair comprises an un-filtered medical image and a corresponding target blended image. The training data pair may be generated according to one or more of the methods disclosed herein, such as method 200, method 300, and method 400, described in FIGS. 2-4. In some embodiments, the training data pair, and the plurality of training data pairs, may be stored in an image processing system, such as in image data 512 of image processing system 500. In other embodiments, the training data pair may be acquired via communicative coupling between the image processing system and an external storage device, such as via Internet connection to a remote server.

In some embodiments, each training data pair may be subdivided into a plurality of training data "patches", by splitting the medical image, and the target blended image, into a plurality of spatially corresponding subregions or "patches". In some embodiments, each of the plurality of patches may be of a same size (e.g., 30 pixels by 30 pixels). In one example, method 600 may include dividing the medical image into a first plurality of patches, dividing the blended image into a second plurality of patches, wherein a number of the first plurality of patches is equal to a number of the second plurality of patches and pairing each patch of the first plurality of patches with a spatially corresponding patch from the second plurality of patches to form a plurality of training data pairs. The plurality of training data pairs so formed may be stored in non-transitory memory of the image processing system. By training the deep neural network using a plurality of smaller patches, a probability of the network overfitting the training data is reduced. Further, in such embodiments, a size of the deep neural network may be reduced, thereby reducing a memory footprint of the deep neural network.

At operation 604, the deep neural network maps the medical image (or medical image patch) to a predicted image (or a predicted image patch). In some embodiments, operation 604 includes the deep neural network mapping a portion of the medical image to a predicted portion of a filtered image. In some embodiments, the deep neural network is a convolutional neural network (CNN), comprising one or more convolutional layers, each convolutional layer comprising one or more convolutional filters. The deep neural network maps the medical image to the predicted image by propagating the image data (that is, the pixel intensity map) from the input layer, through one or more hidden layers, until reaching an output layer.

At operation 606, the imaging system calculates a loss for the predicted image based on a difference between the predicted image and the target blended image. In some embodiments, operation 606 includes the imaging system determining a difference between the predicted portion of the filtered image a corresponding portion of the target blended image. In some embodiments, the loss comprises a mean-squared-error, given by the following equation:

$$MSE = \frac{1}{N}\sum_{i=0}^{N}(x_i - X_i)^2$$

Where MSE stands for mean-squared-error, N is the total number of pixels or voxels in the predicted image, i is an index over the pixels/voxels of the predicted image, $x_i$ is a predicted pixel/voxel intensity value for pixel/voxel i, and $X_i$ is a pixel/voxel intensity value of pixel/voxel i in the target blended image. The expression $x_i - X_i$ will be understood to represent pixel-wise (or voxel-wise) subtraction of each pair of corresponding pixel intensity values in the predicted image and the target blended image, respectively. It will be appreciated that other loss functions known in the art of machine learning may be employed at operation 606.

At operation 608, the weights and biases of the deep neural network are adjusted based on the loss determined at operation 606. In some embodiments, the parameters of deep neural network may be adjusted to reduce the loss over the training data set. In some embodiments, back propagation of the loss may occur according to a gradient descent algorithm, wherein a gradient of the loss function (a first derivative, or approximation of the first derivative) is determined for each weight and bias of the deep neural network. Each weight (and bias) of the deep neural network is then updated by adding the negative of the product of the gradient determined (or approximated) for the weight (or bias) with a predetermined step size. Following operation 608, method 600 may end. It will be noted that method 600 may be repeated for each of a plurality of training data pairs in a training data set, and this process may be repeated until a stop condition is met. Wherein, in some embodiments, the stop condition comprises one or more of the loss decreasing to below a threshold loss, a rate of change in the loss decreasing to below a threshold rate of change, a validation loss, determined over a validation data set, reaching a minimum, etc. In this way, a deep neural network may learn to approximate behavior of one or more conventional filters, but with a reduced rate of filtering artifact inclusion.

Figure 7:
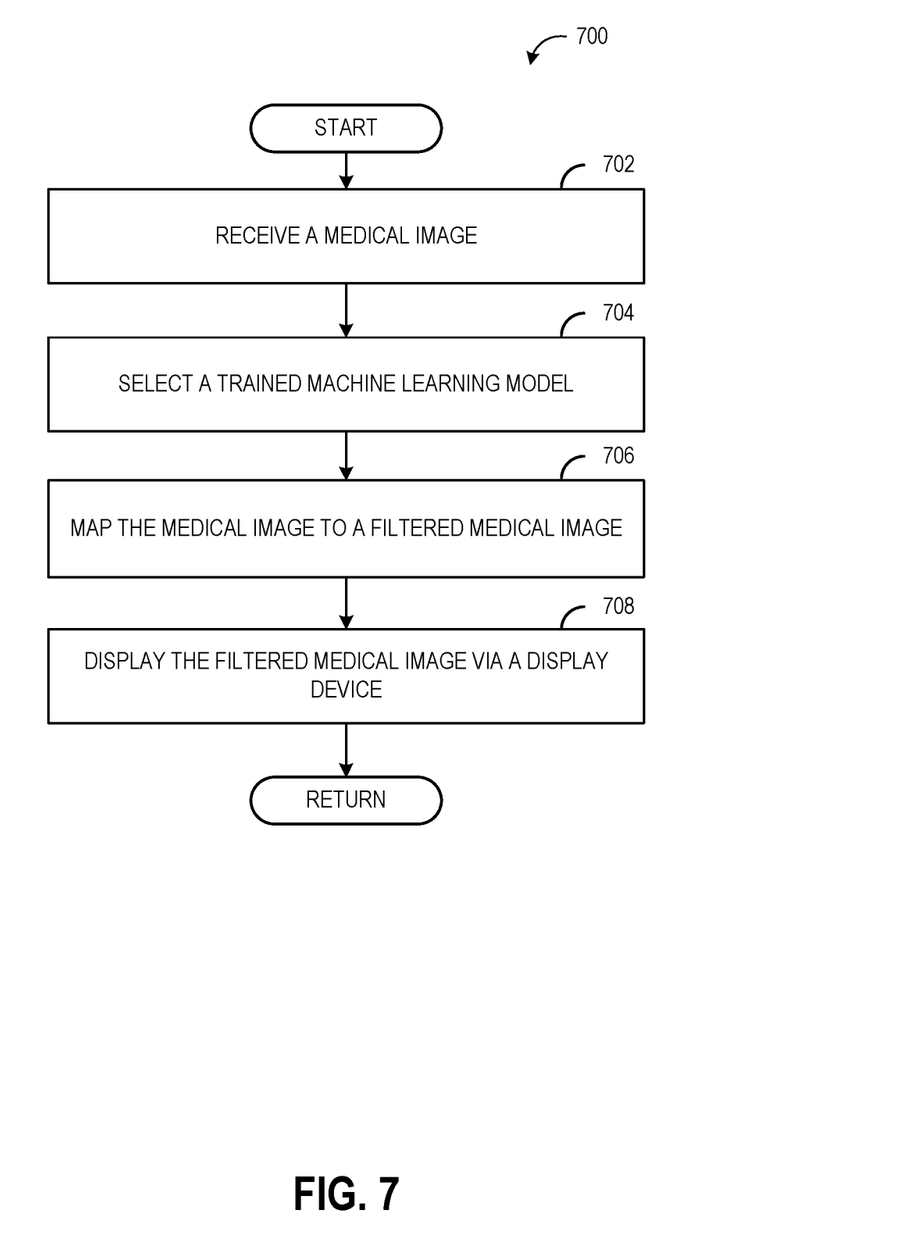
FIG. 7 is a flow chart illustrating a method of implementing a trained machine learning model to filter a medical image, according to embodiments of the current disclosure.

Referring to FIG. 7, a flow chart of an exemplary method 700 for implementing a trained machine learning model to map one or more medical images to one or more corresponding filtered medical images, is shown. Method 700 may be implemented by an image processing system, such as image processing system 500, shown in FIG. 5. In some embodiments, the image processing system executing method 700 may be communicatively coupled to one or more medical imaging devices, from which the image processing system may receive medical images. In some embodiments, method 700 may be executed during a medical imaging procedure, to de-noise, sharpen edges of one or more anatomical features, or otherwise enhance medical images acquired in substantially real time.

Method 700 begins at operation 702, wherein the image processing system receives a medical image. The medical image may include one or more anatomical regions or anatomical structures present therein. As an example, at operation 702 the image processing system may receive a cardiac ultrasound image of one or more heart valves of an imaging subject. In some embodiments, the image received at operation 702 is one image of an image sequence, wherein the image sequence may comprise a plurality of 2D image slices composing a 3D image, or wherein the image sequence comprises a plurality of 2D or 3D frames of a 2D or 3D video.

At operation 704, the image processing system selects a trained machine learning model. In some embodiments, the trained machine learning model may be selected automatically based on one or more properties of the medical image received at operation 702. In one example, a machine learning model trained to map ultrasound images to blended ultrasound images may be selected automatically in response to the medical image received at operation 702 being an ultrasound image. Further, in some embodiments, the trained machine learning model may be selected based on or more metadata of the medical image, e.g., data stored in a DICOM header of the medical image. In some embodiments, the trained machine learning model may be selected based on user input received via a user input device. In some embodiments, the user input may include selection of one or more conventional filters (e.g., one or more de-noising filters, one or more sharpening filters, etc.), and the trained machine learning model may be selected based on a training dataset used to train the machine learning model matching the one or more selected filters. As an example, a machine learning model trained according to one or more methods disclosed herein to approximate an edge enhancement filter, may be selected at operation 704 in response to the image processing system receiving a user input specifying an edge enhancement filter. In some embodiments, the trained machine learning model may comprise a convolutional neural network trained on a training dataset comprising a plurality of medical images and a plurality of blended medical images, such as is described in more detail in the above description of method 600.

At operation 706, the image processing system maps the medical image to a filtered medical image. It will be appreciated that the term "filtered medical image" applied in the description of operation 706 is distinct from a conventionally filtered medical image, such as the filtered medical images produced at operation 204 of method 200, as the filtered medical image produced at operation 706 is produced by a trained machine learning model using blended images as target images, thereby reducing a probability of filtering artifact inclusion in the "filtered medical image" of operation 706 as compared to the conventionally filtered medical images of operation 204. In some embodiments, operation 706 includes the trained machine learning model mapping a portion of the medical image to a corresponding portion of the filtered image. The trained machine learning model maps the medical image to the filtered medical image by propagating the image data (that is, the pixel/voxel intensity map) from the input layer, through one or more hidden layers, until reaching an output layer.

At operation 708, the image processing system displays the filtered medical image via a display device. Visual characteristics of the filtered medical image may be similar to those produced by one or more conventional filters, but with an absence of filtering artifacts. In particular, the filtered medical image displayed at operation 708 may not include thickening of one or more anatomical structures present in the medical image (e.g., thickening of one or more heart valve captured in the medical image received at operation 702), hallucination of an anatomical structure not present in the first medical image, hallucination of a connection between a first anatomical structure and a second anatomical structure (e.g., hallucination of an anatomical structure/tissue over/across a heart valve opening), wherein the first anatomical structure and the second anatomical structure are present in the first medical image.

Following operation 708, method 700 may end. In this way, method 700 enables substantially real-time enhancement of medical images by directly mapping medical images from a first image space (an un-filtered image space) to a second image space defined by the blended images of the training dataset. In this way, enhancements afforded by one or more conventional filters may be achieved using a single trained machine learning model, while reducing a probability of filtering artifact inclusion in the filtered medical image so produced.

The disclosure also provides support for a method comprising: receiving a medical image, applying a filter to the medical image to produce a filtered medical image, wherein a subregion of the filtered medical image includes a filtering artifact, displaying the filtered medical image via a display device, receiving a selection of the subregion of the filtered medical image from a user input device, blending, in the subregion, pixel intensity values from the filtered medical image with pixel intensity values from the medical image, to produce a blended image, wherein a visibility of the filtering artifact is attenuated in the blended image, displaying the blended image via the display device, storing the medical image and the blended image as a training data pair, and training a machine learning model using the training data pair. In a first example of the method in the subregion, pixel intensity values from the filtered medical image with pixel intensity values from the medical image, comprises setting a blended intensity value, of a pixel i in the subregion of the blended image according to a blending equation. In a second example of the method, optionally including the first example, the blended intensity value, is set based on a first weighting factor, and a second weighting factor, wherein the first weighting factor corresponds to the medical image, and the second weighting factor corresponds to the filtered medical image. In a third example of the method, optionally including one or both of the first and second examples, training the machine learning model using the training data pair comprises: mapping the medical image to a predicted image using the machine learning model, determining a difference between the predicted image and the blended image, and updating parameters of the machine learning model based on the difference between the predicted image and the blended image. In a fourth example of the method, optionally including one or more or each of the first through third examples, the machine learning model comprises a convolutional neural network. In a fifth example of the method, optionally including one or more or each of the first through fourth examples, the medical image is a first image of an image sequence, and wherein the method further comprises: applying the filter to a second medical image of the image sequence to produce a second filtered medical image, automatically blending, in a subregion of the second filtered medical image, pixel intensity values from the second medical image with pixel intensity values from the second filtered medical image, to produce a second blended image, and displaying the second blended image via the display device. In a sixth example of the method, optionally including one or more or each of the first through fifth examples, the filter is one or more of a sharpening filter and a smoothing filter. In a seventh example of the method, optionally including one or more or each of the first through sixth examples, the method further includes: dividing the medical image into a first plurality of patches, dividing the blended image into a second plurality of patches, wherein a number of the first plurality of patches is equal to a number of the second plurality of patches, pairing each patch of the first plurality of patches with a spatially corresponding patch from the second plurality of patches, to form a plurality of training data pairs, and storing the plurality of training data pairs in non-transitory memory.

The disclosure also provides support for a method comprising: receiving a medical image, applying a plurality of filters to the medical image to produce a plurality of filtered medical images, displaying the plurality of filtered medical images via a display device, receiving a selection of a subregion of a filtered medical image from the plurality of filtered medical images, blending, in the subregion, pixel intensity values from the filtered medical image with one or more of, pixel intensity values from a corresponding subregion of the medical image, and pixel intensity values from a corresponding subregion of one or more other filtered medical images of the plurality of filtered medical images, to produce a blended image, and displaying the blended image via the display device, and storing the medical image and the blended image as a training data pair. In a first example of the method in the subregion, pixel intensity values from the filtered medical image with one or more of, pixel intensity values from the corresponding subregion of the medical image, and pixel intensity values from the corresponding subregion of one or more other filtered medical images of the plurality of filtered medical images, to produce a blended image, comprises setting a pixel intensity value in the subregion of the filtered medical image according to a blending equation. In a second example of the method, optionally including the first example, the blending equation includes at least a first weighting factor corresponding to the filtered medical image, and one or more additional weighting factors corresponding to the one or more other filtered medical images of the plurality of filtered medical images. In a third example of the method, optionally including one or both of the first and second examples the method further comprising: training a machine learning model using the training data pair, wherein training the machine learning model comprises: mapping a portion of the medical image to a predicted portion of a filtered image using the machine learning model, determining a difference between the predicted portion of the filtered image a corresponding portion of the blended image, and updating parameters of the machine learning model based on the difference. In a fourth example of the method, optionally including one or more or each of the first through third examples, the subregion is a first subregion, and wherein the blended image is a first blended image, the method further comprising: receiving a selection of a second subregion of the filtered medical image, blending, in the second subregion, pixel intensity values from the filtered medical image with one or more of, pixel intensity values from a corresponding second subregion of the medical image, and pixel intensity values from a corresponding second subregion of one or more other filtered medical images of the plurality of filtered medical images, to produce a second blended image, and displaying the second blended image via the display device. In a fifth example of the method, optionally including one or more or each of the first through fourth examples, the first blended image is produced using a first plurality of weighting factors, and wherein the second blended image is produced using a second plurality of weighting factors, wherein the first plurality of weighting factors is not equivalent to the second plurality of weighting factors.

The disclosure also provides support for a system, comprising: a display device, a memory storing instructions, and a processor communicably coupled to the memory and when executing the instructions, configured to: receive a first medical image, select a trained machine learning model, wherein the trained machine learning model is a convolutional neural network trained on a training dataset comprising a plurality of medical images and a plurality of blended medical images, map the first medical image using the trained machine learning model to a first filtered medical image, and display the first filtered medical image via the display device. In a first example of the system, the first filtered medical image does not include: thickening of one or more anatomical structures present in first medical image, hallucination of an anatomical structure not present in the first medical image, hallucination of a connection between a first anatomical structure and a second anatomical structure, wherein the first anatomical structure and the second anatomical structure are present in the first medical image. In a second example of the system, optionally including the first example, a training data pair of the training dataset includes a second medical image and a corresponding blended image. In a third example of the system, optionally including one or both of the first and second examples, the blended image comprises at least a first subregion, wherein pixel intensity values in the first subregion comprise a weighted average of pixel intensity values from a second filtered medical image, and pixel intensity values from the second medical image. In a fourth example of the system, optionally including one or more or each of the first through third examples, the first subregion encompasses less than an entirety of the second filtered medical image. In a fifth example of the system, optionally including one or more or each of the first through fourth examples, the convolutional neural network is configured to approximate one or more noise reduction filters and boundary enhancement filters.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method comprising:
   receiving a medical image;
   applying a filter to the medical image to produce a filtered medical image, wherein a subregion of the filtered medical image includes a filtering artifact;
   displaying the filtered medical image via a display device;
   receiving a selection of the subregion of the filtered medical image from a user input device;
   blending, in the subregion, pixel intensity values from the filtered medical image with pixel intensity values from the medical image, to produce a blended image, wherein a visibility of the filtering artifact is attenuated in the blended image;
   displaying the blended image via the display device;
   storing the medical image and the blended image as a training data pair;
   training a machine learning model using the training data pair;
   dividing the medical image into a first plurality of patches;
   dividing the blended image into a second plurality of patches, wherein a number of the first plurality of patches is equal to a number of the second plurality of patches;
   pairing each patch of the first plurality of patches with a spatially corresponding patch from the second plurality of patches, to form a plurality of training data pairs; and
   storing the plurality of training data pairs in non-transitory memory.

2. The method of claim 1, wherein blending, in the subregion, pixel intensity values from the filtered medical image with pixel intensity values from the medical image, comprises setting a blended intensity value, of a pixel i in the subregion of the blended image according to a blending equation.

3. The method of claim 2, wherein the blended intensity value, is set based on a first weighting factor, and a second weighting factor, wherein the first weighting factor corresponds to the medical image, and the second weighting factor corresponds to the filtered medical image.

4. The method of claim 1, wherein training the machine learning model using the training data pair comprises:
   mapping the medical image to a predicted image using the machine learning model;
   determining a difference between the predicted image and the blended image; and
   updating parameters of the machine learning model based on the difference between the predicted image and the blended image.

5. The method of claim 4, wherein the machine learning model comprises a convolutional neural network.

6. The method of claim 1, wherein the medical image is a first image of an image sequence, and wherein the method further comprises:
   applying the filter to a second medical image of the image sequence to produce a second filtered medical image;
   automatically blending, in a subregion of the second filtered medical image, pixel intensity values from the second medical image with pixel intensity values from the second filtered medical image, to produce a second blended image; and
   displaying the second blended image via the display device.

7. The method of claim 1, wherein the filter is one or more of a sharpening filter and a smoothing filter.

8. A method comprising:
   receiving a medical image;
   applying a plurality of filters to the medical image to produce a plurality of filtered medical images;
   displaying the plurality of filtered medical images via a display device;
   receiving a selection of a subregion of a filtered medical image from the plurality of filtered medical images;
   blending, in the subregion, pixel intensity values from the filtered medical image with one or more of, pixel intensity values from a corresponding subregion of the medical image, and pixel intensity values from a corresponding subregion of one or more other filtered medical images of the plurality of filtered medical images, to produce a blended image;
   displaying the blended image via the display device;
   storing the medical image and the blended image as a training data pair;
   dividing the medical image into a first plurality of patches;
   dividing the blended image into a second plurality of patches, wherein a number of the first plurality of patches is equal to a number of the second plurality of patches;
   pairing each patch of the first plurality of patches with a spatially corresponding patch from the second plurality of patches, to form a plurality of training data pairs; and
   storing the plurality of training data pairs in non-transitory memory.

9. The method of claim 8, wherein blending, in the subregion, pixel intensity values from the filtered medical image with one or more of, pixel intensity values from the corresponding subregion of the medical image, and pixel intensity values from the corresponding subregion of one or more other filtered medical images of the plurality of filtered medical images, to produce a blended image, comprises setting a pixel intensity value in the subregion of the filtered medical image according to a blending equation.

10. The method of claim 9, wherein the blending equation includes at least a first weighting factor corresponding to the filtered medical image, and one or more additional weighting factors corresponding to the one or more other filtered medical images of the plurality of filtered medical images.

11. The method of claim 8, the method further comprising:
   training a machine learning model using the training data pair, wherein training the machine learning model comprises:
      mapping a portion of the medical image to a predicted portion of a filtered image using the machine learning model;
      determining a difference between the predicted portion of the filtered image a corresponding portion of the blended image; and
      updating parameters of the machine learning model based on the difference.

12. The method of claim 8, wherein the subregion is a first subregion, and wherein the blended image is a first blended image, the method further comprising:
   receiving a selection of a second subregion of the filtered medical image;
   blending, in the second subregion, pixel intensity values from the filtered medical image with one or more of, pixel intensity values from a corresponding second subregion of the medical image, and pixel intensity values from a corresponding second subregion of one or more other filtered medical images of the plurality of filtered medical images, to produce a second blended image; and displaying the second blended image via the display device.

13. The method of claim 12, wherein the first blended image is produced using a first plurality of weighting factors, and wherein the second blended image is produced using a second plurality of weighting factors, wherein the first plurality of weighting factors is not equivalent to the second plurality of weighting factors.

14. A system, comprising:
a display device;
a memory storing instructions; and
a processor communicably coupled to the memory and when executing the instructions, configured to:
receive a first medical image;
select a trained machine learning model, wherein the trained machine learning model is a convolutional neural network trained on a training dataset comprising a plurality of medical images and a plurality of blended medical images;
map the first medical image using the trained machine learning model to a first filtered medical image; and
display the first filtered medical image via the display device;
divide the medical image into a first plurality of patches;
divide the blended image into a second plurality of patches, wherein a number of the first plurality of patches is equal to a number of the second plurality of patches;
pair each patch of the first plurality of patches with a spatially corresponding patch from the second plurality of patches, to form a plurality of training data pairs; and
store the plurality of training data pairs in non-transitory memory.

15. The system of claim 14, wherein the first filtered medical image does not include:
thickening of one or more anatomical structures present in first medical image;
hallucination of an anatomical structure not present in the first medical image;
hallucination of a connection between a first anatomical structure and a second anatomical structure, wherein the first anatomical structure and the second anatomical structure are present in the first medical image.

16. The system of claim 14, wherein a training data pair of the training dataset includes a second medical image and a corresponding blended image.

17. The system of claim 16, wherein the blended image comprises at least a first subregion, wherein pixel intensity values in the first subregion comprise a weighted average of pixel intensity values from a second filtered medical image, and pixel intensity values from the second medical image.

18. The system of claim 17, wherein the first subregion encompasses less than an entirety of the second filtered medical image.

19. The system of claim 14, wherein the convolutional neural network is configured to approximate one or more noise reduction filters and boundary enhancement filters.

* * * * *